(12) United States Patent
Oshidari et al.

(10) Patent No.: US 6,527,667 B2
(45) Date of Patent: Mar. 4, 2003

(54) TOROIDAL CONTINUOUSLY VARIABLE TRANSMISSION

(75) Inventors: Toshikazu Oshidari, Kanagawa (JP); Jun Watanabe, Yokohama (JP); Nobutaka Chiba, Kanagawa (JP); Toshikazu Nanbu, Kanagawa (JP); Makoto Kanou, Yokohama (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 09/893,451

(22) Filed: Jun. 29, 2001

(65) Prior Publication Data

US 2002/0002098 A1 Jan. 3, 2002

(30) Foreign Application Priority Data

Jun. 29, 2000 (JP) ......................... 2000-196684
Jul. 11, 2000 (JP) ......................... 2000-210078
Mar. 6, 2001 (JP) ......................... 2001-062696

(51) Int. Cl.$^7$ ............................................. F16H 15/38
(52) U.S. Cl. ........................................... 476/40; 476/72
(58) Field of Search ............................. 476/40, 42, 72, 476/73

(56) References Cited

FOREIGN PATENT DOCUMENTS

JP   11-148542   6/1999

OTHER PUBLICATIONS

U.S. patent application Ser. No. 09/775,565, Yoshida et al., filed Feb. 5, 2001.
U.S. patent application Ser. No. 09/814,165, Ushijima et al., filed Mar. 22, 2001.
"Structural Steels with Specified Hardenability Bands", Japanese Industrial Standard, JIS G 4052, pp. 542, 543, 560, and 561 (1979).
Hirohisa Tanaka, "Toroidal Continuously Variable Transmission", Corona Publishing Co., Ltd., p. 29–30 (2000).

*Primary Examiner*—William C Joyce
(74) *Attorney, Agent, or Firm*—Foley & Lardner

(57) ABSTRACT

A toroidal continuously variable transmission including input and output disks having a common first rotation axis about which the disks are rotatable, and a power roller swingably interposed between the disks and having a second rotation axis intersecting the first rotation axis, about which the power roller is rotatable. The input and output disks and the power roller have traction surfaces cooperating with each other to transmit rotation therebetween. At least one of the input and output disks and the power roller has a surface roughness on the traction surface thereof which varies in a direction of the rotation axis thereof.

18 Claims, 15 Drawing Sheets

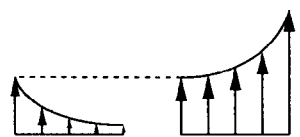
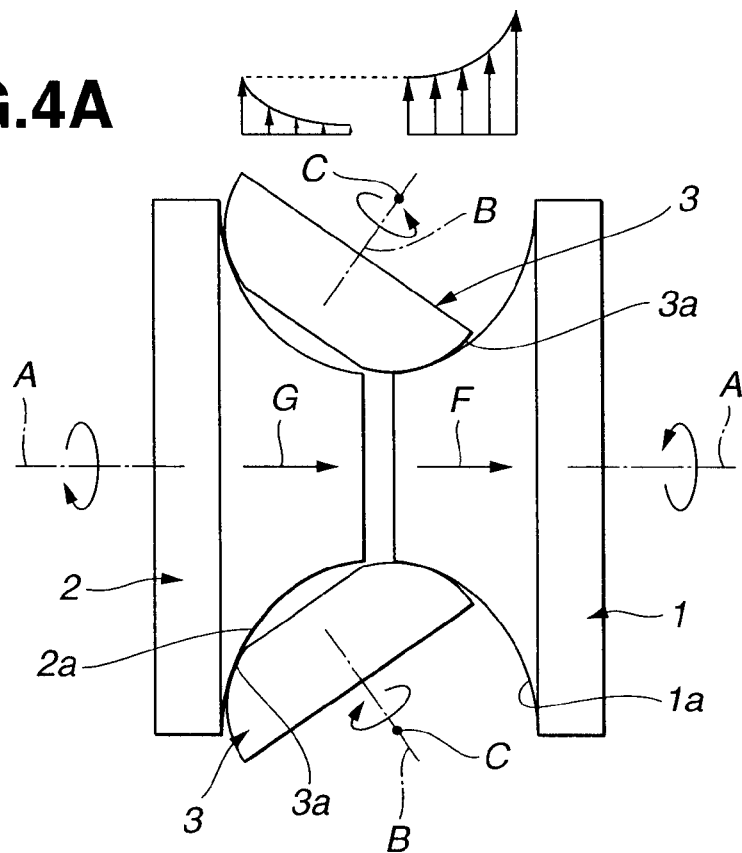
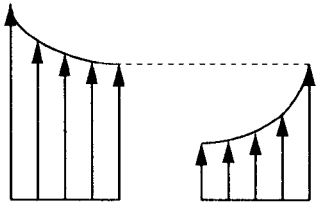
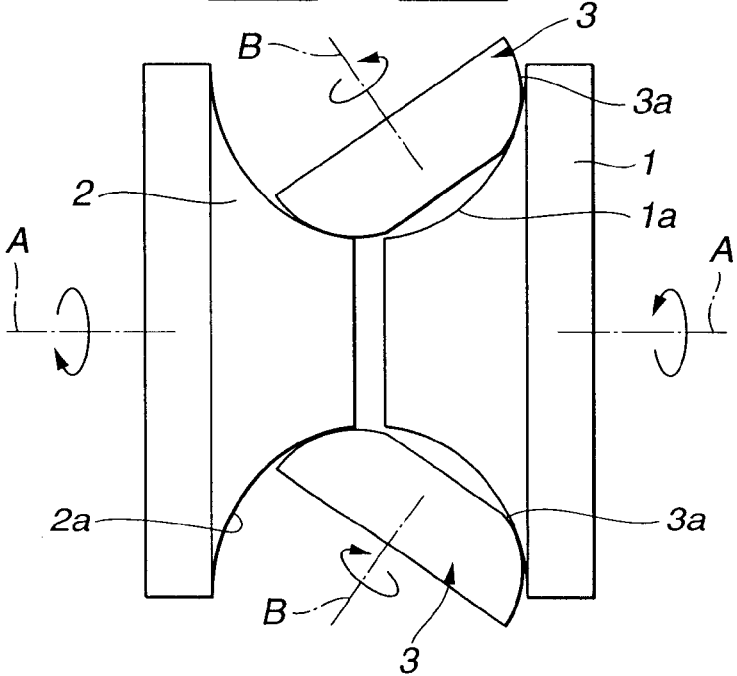

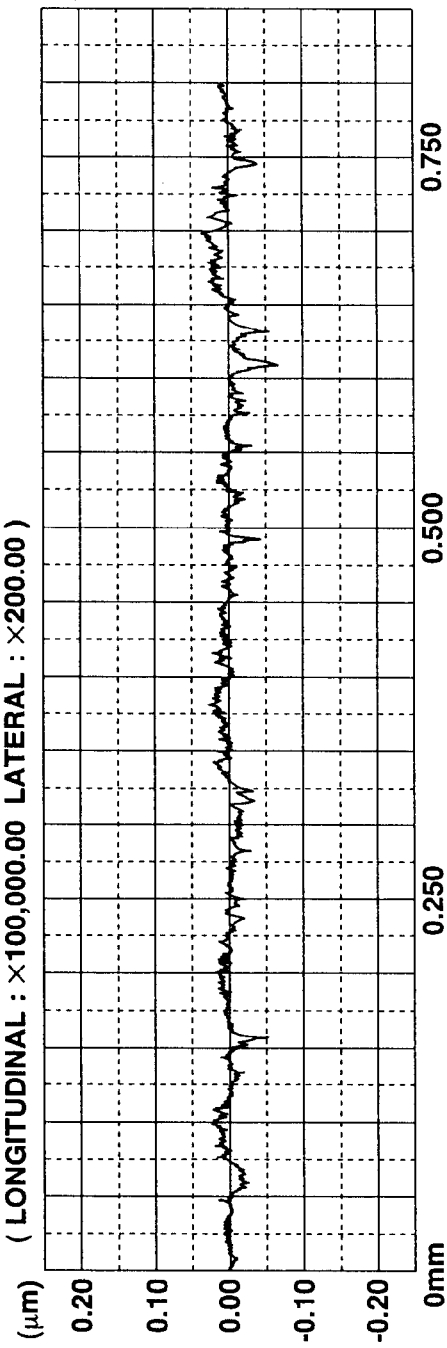
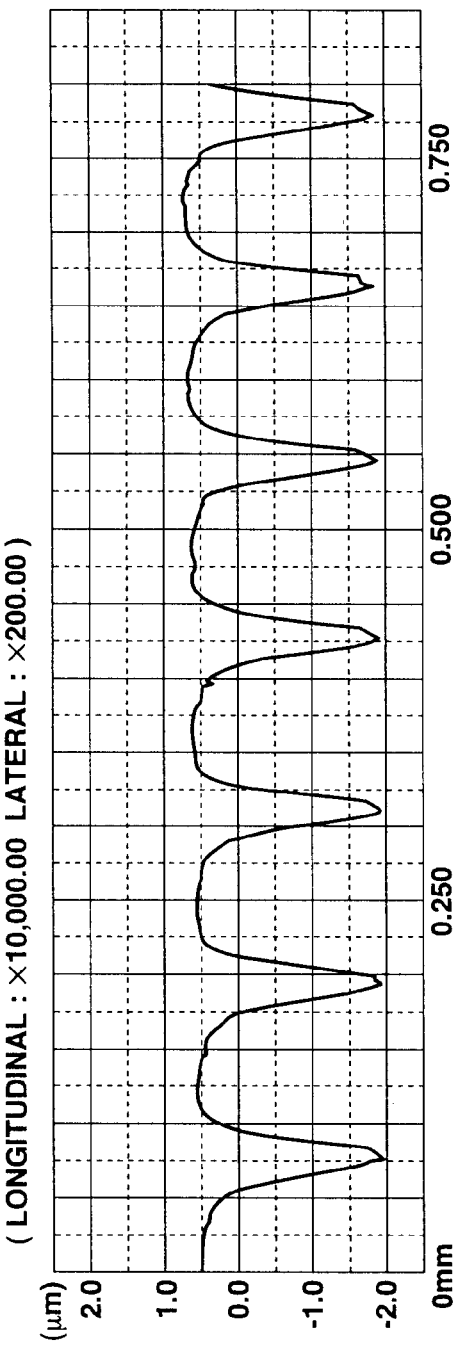

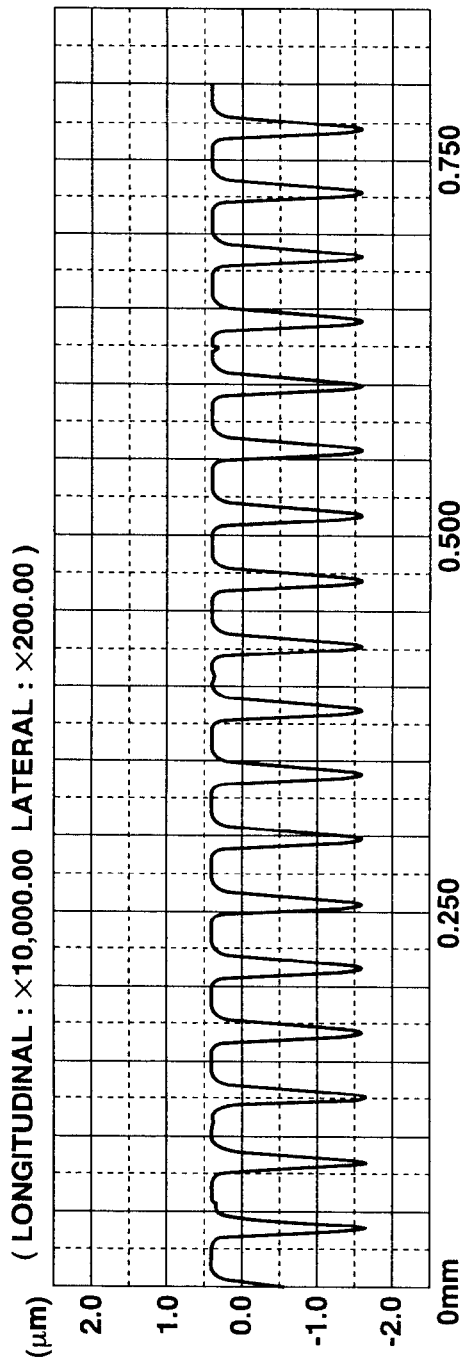
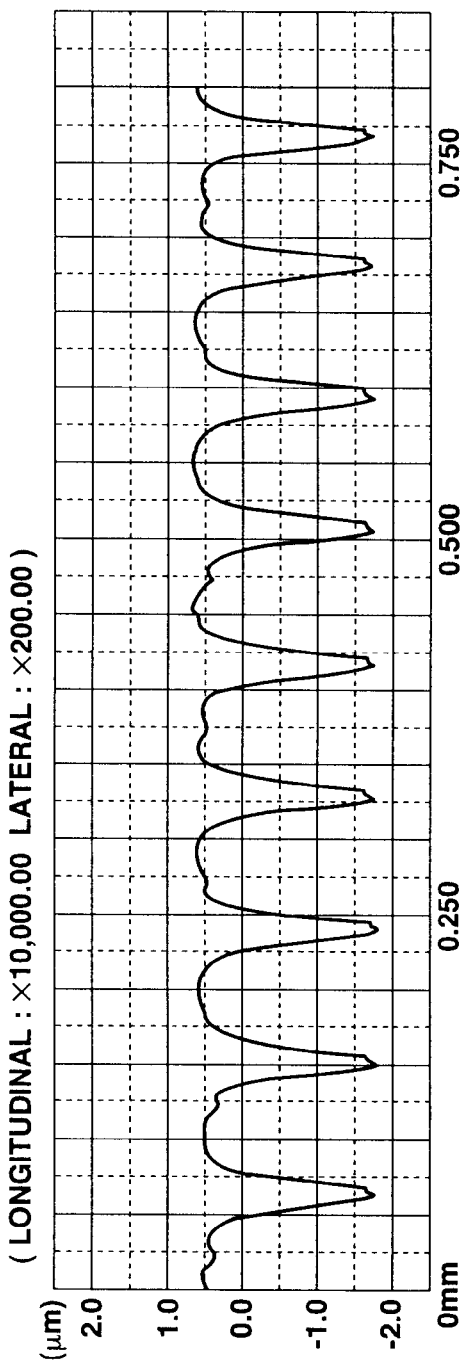

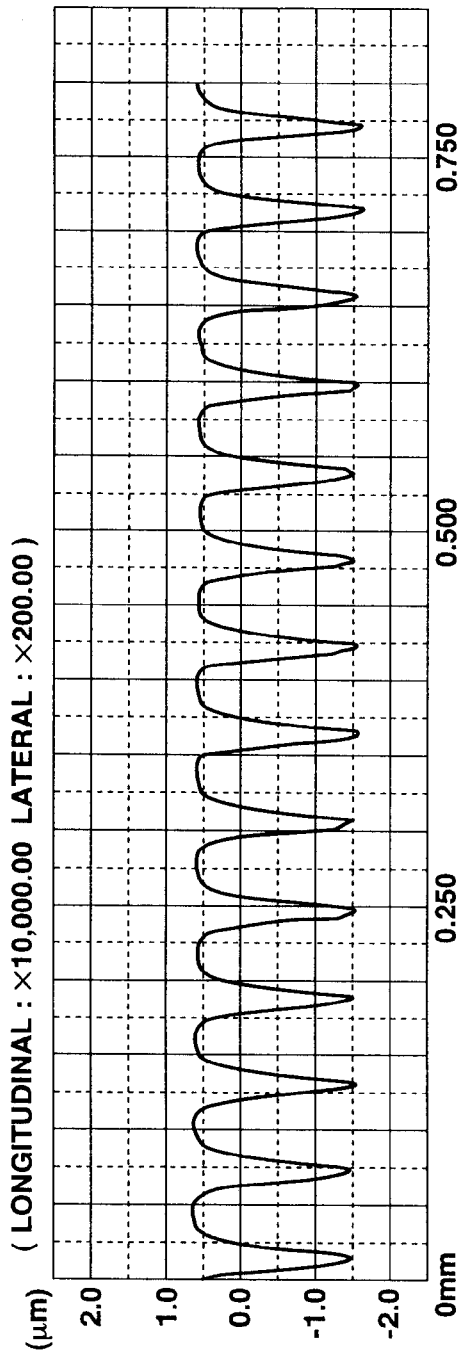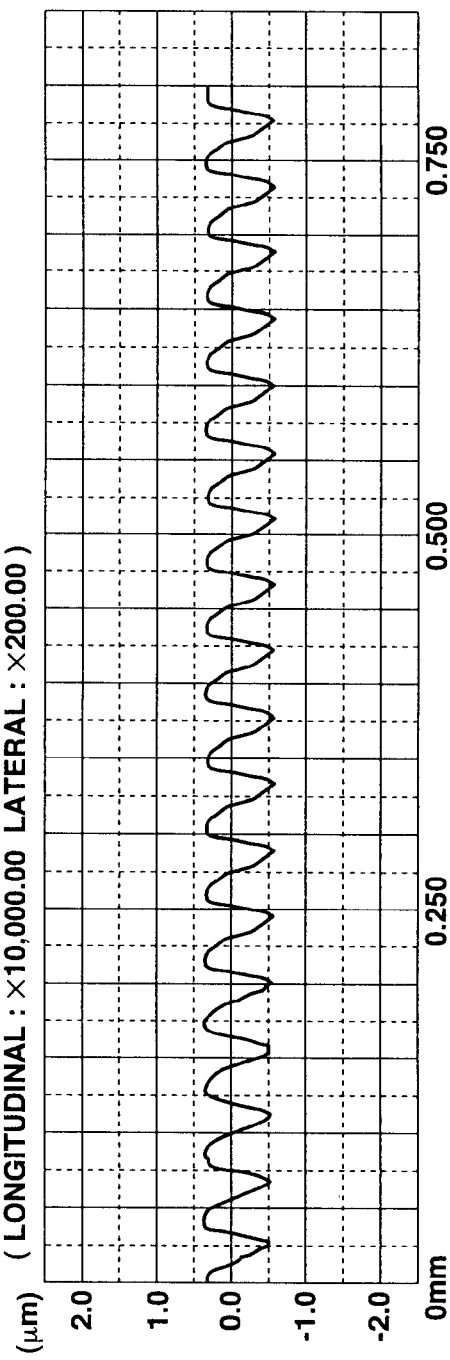

TOROIDAL CONTINUOUSLY VARIABLE TRANSMISSION

BACKGROUND OF THE INVENTION

The present invention relates to a toroidal continuously variable transmission (CVT) useable for automobiles.

Toroidal CVTs include generally toroid curved surface input and output disks coaxially arranged in spaced and opposed relation, and a plurality of power rollers disposed within a toroidal cavity formed between the input and output disks. A traction oil film is disposed between traction surfaces of the input and output disks and traction surfaces of the power rollers. The power rollers rotate to transmit rotation of the input disk to the output disk via the traction surfaces and the traction oil film. During the transmission of rotation, the power rollers swing relative to the input and output disks so that the mutually contacted portions between the power rollers and the input and output disks are displaced to thereby continuously change the gear ratio.

Japanese Patent Application First Publication No. 11-148542 discloses the toroidal CVT in which traction surfaces of power rollers have an arithmetical mean roughness Ra of 0.05 $\mu$m or less. The earlier technique aims to prevent the traction oil film between the traction surfaces of the power rollers and input and output disks from being less formed or reduced in thickness due to heat and shear stress which are caused by spin of the traction surfaces, to thereby restrain deterioration of durability of the toroidal CVT.

SUMMARY OF THE INVENTION

The traction surfaces of the power rollers which have the surface roughness of 0.05 Ra or less as described in the earlier technique, are relatively smooth. It will be appreciated that the traction oil film formed between the traction surfaces of the disks and power rollers has an excessive thickness under condition that rolling speed of the disks and power rollers is high. The excessively thickened traction oil film causes reduction of traction coefficient of the toroidal CVT.

Generally, it is known that in the toroidal CVTs, the traction surface of each of the power rollers is in contact, at substantially the same circumferential portion, with the traction surfaces of the disks, regardless the gear ratio. On the other hand, the traction surface of each of the disks is in contact, at different circumferential portions, with the traction surfaces of the power rollers. This is because the contact portions of the traction surfaces of the disks contacted with the traction surfaces of the power rollers is displaced between the increased-diameter side and reduced-diameter side of the disks depending on the gear ratio. The circumferential speeds of the disks, therefore, are variable depending on the degree of displacement of the contact portions of the traction surfaces of the disks contacted with the traction surfaces of the power rollers, even if the rotation number of the input disk is the same.

In addition, it is also known that change in thickness of an oil film is less affected by load (torque in transmissions) but the change is considerably affected by circumferential speed and temperature. This is appreciated from the following formula of Hamrock-Dowson in calculation of minimum oil film thickness $H_{min}$.

$$H_{min} = 3.63 U^{0.68} G^{0.49} W^{-0.073} \{1 - \exp(-0.68k)\}$$

where
$U = \eta_o u / ER$
$G = \alpha E$
$W = w / ER^2$ $u = (u_1 + u_2)/2$ where
U is a parameter of speed, G is a parameter of material, W is a parameter of load, k is a parameter of ellipse, $\eta_o$ is an oil viscosity under atmospheric pressure, u is a circumferential speed, E is an equivalent elastic coefficient, R is an equivalent radius of curvature, $\alpha$ is a pressure coefficient in oil viscosity, w is a load, and $u_1$ and $u_2$ are circumferential speeds of two rolling elements, respectively.

In the toroidal CVT of the earlier technique as described above, the surface roughness of the traction surface of each disk is not disclosed. Assuming that the surface roughness of the traction surface of the disk is set at a uniform roughness value for a relatively smooth surface in order to assure durability of the disk, the thickness of the traction oil film will be inadequately increased in HIGH speed range where the circumferential speed is high and the traction oil film is likely to be formed. Namely, in the HIGH speed range, the input disk is operated on the increased-diameter side of and the output disk is operated on the reduced-diameter side. Further, if the oil film thickness is inadequately increased, a shear rate will be lowered to thereby undesirably reduce a traction coefficient. A shearing force generated by the traction oil is simply expressed by the formula: (viscosity)×(shear rate). The viscosity of the traction oil decreases at high temperature. Therefore, if the temperature of the traction oil is high, the traction coefficient will be reduced.

There is a demand to solve the above-described problems in the earlier technique and maintain high traction coefficient during the operation of the toroidal CVT.

Meanwhile, the loading force applied to the power roller by the disks may be increased in order to suppress the formation of an excessively thickened traction oil film therebetween. In this case, reduction of the size of the disks and power roller will cause great difficulty due to limited material strength. In addition, loss in power transmission which is generated at bearings within the toroidal CVT, will be increased, resulting in lowering fuel economy.

Further, in the toroidal CVT, the traction surface of the power roller includes a so-called contact ellipse, i.e., an elliptical contact area where the traction surface of the power roller is in contact with that of each disk. During the operation of the toroidal CVT, high contact surface pressure is exerted onto a central portion of the contact ellipse. This causes fatigue at the central portion of the contact ellipse so that peeling or abrasion will occur there. On the other hand, low contact surface pressure is exerted on both end portions of the contact ellipse which are opposed to each other in the swing direction of the power roller. However, slippage occurs due to spin at the both end portions of the contact ellipse. This will cause wear at both end portions of the contact ellipse when the thin traction oil film is formed during the starting operation of the toroidal CVT. There is a demand to solve the above-described problems and improve both the durability and the traction coefficient in the toroidal CVT.

An object of the present invention is to provide a toroidal CVT which includes input and output disks and power rollers interposed therebetween, capable of restraining a thickness of the traction oil film formed between the disks and the power rollers from being excessively increased, thereby maintaining high traction coefficient, and achieving improvement in durability.

According to one aspect of the present invention, there is provided a toroidal continuously variable transmission, comprising:

an input disk;

an output disk, the input and output disks having a common first rotation axis about which the input and output disks are rotatable; and a power roller swingably interposed between the input and output disks and having a second rotation axis intersecting the first rotation axis, about which the power roller is rotatable, the input and output disks and the power roller having traction surfaces cooperating with each other to transmit rotation between the input and output disks and the power roller, at least one of the input and output disks and the power roller having a surface roughness on the traction surface thereof which varies in a direction of the rotation axis thereof.

BRIEF DESCRIPTION OF THE DRAWINGS

FIG. 4A is a graph showing circumferential speed of disks of the toroidal CVT in LOW speed range;

FIG. 4B is a diagram showing the toroidal CVT of a second embodiment according to the present invention, which is conditioned in the LOW speed range;

FIG. 4C is a graph showing circumferential speed of disks of the toroidal CVT in HIGH speed range;

FIG. 4D is a diagram showing the toroidal CVT in the HIGH speed range;

FIG. 13 is a graph showing an unfiltered primary profile curve of the traction surface of the disks;

FIG. 14 is a graph showing an unfiltered primary profile curve of the traction surface of the power roller; and FIGS. 15–21 are graphs showing unfiltered primary profile curves of the traction surfaces modified.

DETAILED DESCRIPTION OF THE PREFERRED EMBODIMENTS

Referring to FIGS. 1A, 1B, 2 and 3, a toroidal continuously variable transmission (CVT) of a first embodiment according to the present invention is explained. In this embodiment, the toroidal CVT is useable in automobiles.

Figure 1A:
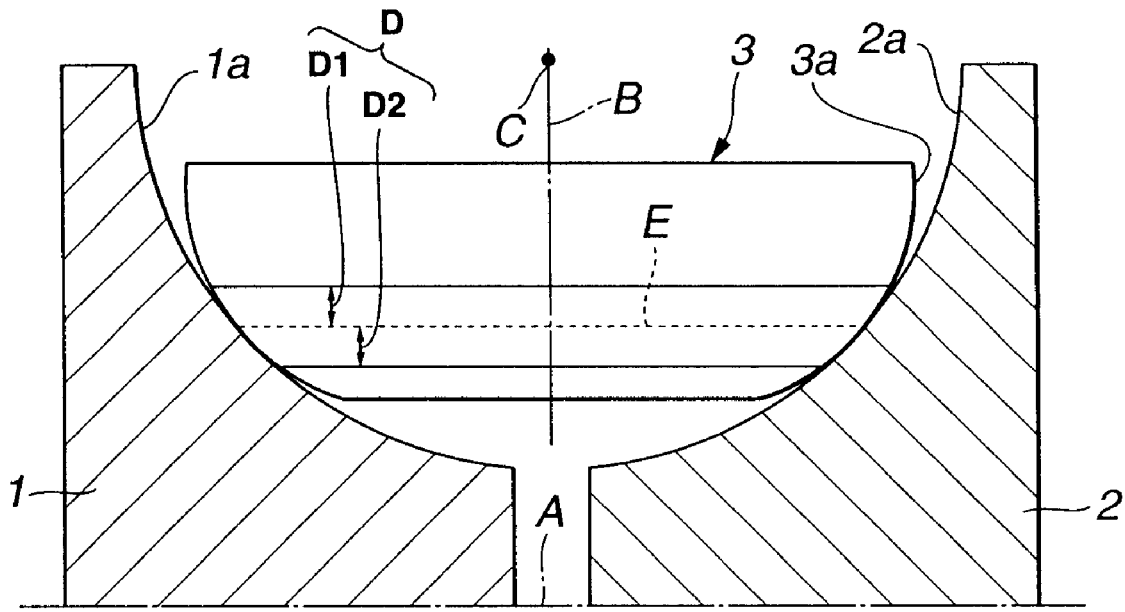
FIG. 1A is a cross-sectional view showing an upper half of a toroidal continuously variable transmission (CVT) of a first embodiment according to the present invention.
Figure 1B:
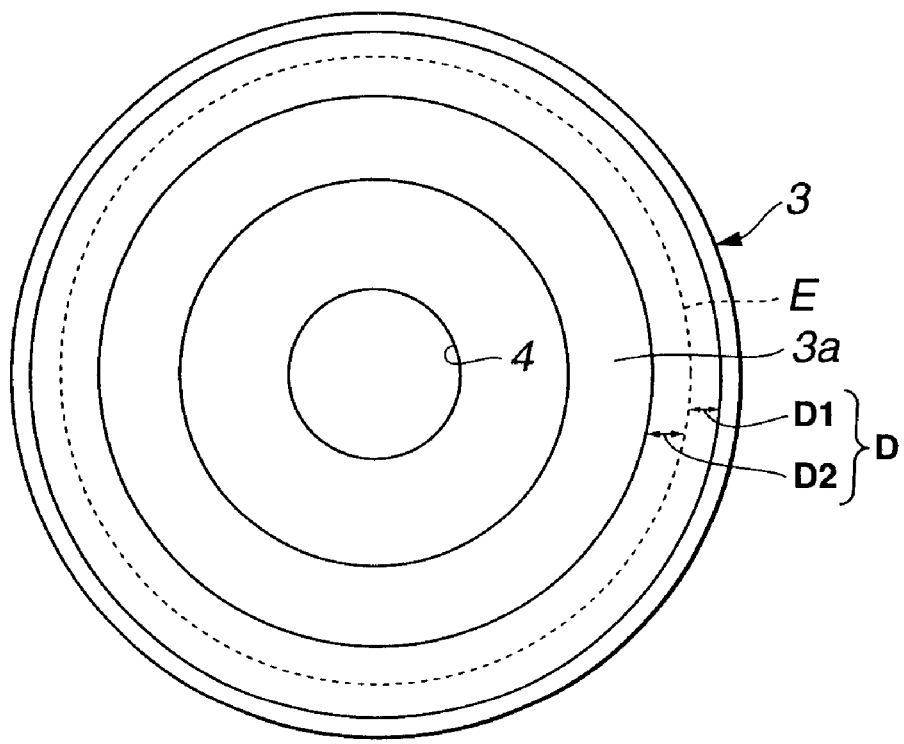
FIG. 1B is a bottom view of a power roller used in the toroidal CVT shown in FIG. 1A.

As illustrated in FIG. 1A, the toroidal CVT includes input disk 1, output disk 2 and power roller 3 interposed between input and output disks 1 and 2. In FIG. 1A, one of a plurality of power rollers 3 is illustrated. Input disk 1 is drivingly coupled with an engine via a power train, and output disk 2 is drivingly coupled with an axle via another power train. Input and output disks 1 and 2 are rotatable about axis A, respectively. Each of input disk 1 and output disk 2 has a generally frustoconical shape gradually decreasing in diameter from an increased-diameter side to a reduced-diameter side. Input and output disks 1 and 2 have traction surfaces 1a and 2a, respectively, which circumferentially extend and form concavely curved surfaces. Input and output disks 1 and 2 are coaxially arranged in such a manner that axial ends located on the reduced-diameter sides are opposed to each other. Power roller 3 has traction surface 3a circumferentially extending and forming a convexly curved surface. Power roller 3 has a central connection hole 4 shown in FIG. 1B, through which power roller 3 is mounted to a support member, not shown. Power roller 3 is rotatable about axis B intersecting rotation axis A of disks 1 and 2 and swingable about swing center C, which is located on rotation axis B, to be inclined relative to disks 1 and 2. Power roller 3 is operated by a drive mechanism, not shown. Power roller 3 is contacted with input and output disks 1 and 2 at a predetermined pressure by pressure-apply mechanisms for applying load or force to disks 1 and 2 in a direction of rotation axis A and to power roller 3 in a direction of rotation axis B, respectively. Power roller 3 is in contact with input and output disks 1 and 2 via a traction oil film formed therebetween. At least one of input and output disks 1 and 2 and power roller 3 has a surface roughness on traction surface 1a, 2a and 3a thereof which varies in a direction of rotation axis A and B thereof.

In this embodiment, traction surface 3a of power roller 3 has a surface roughness varying in the direction of rotation axis B. Specifically, traction surface 3a has a microstructure with irregularities at only contact region D shown in FIGS. 1A and 1B, in which traction surface 3a is substantially in contact with traction surfaces 1a and 2a of disks 1 and 2. The irregularities of the microstructure is formed by recesses and projections alternately arranged. The recesses are in the form of dimples or grooves and varied in at least one of a depth and a density in the direction of rotation axis B. Here, the density of the recesses means a ratio of a sum of areas of the recesses to unit area in contact region D of traction surface 3a of power roller 3. Concretely, contact region D extends over an outer circumferential surface of power roller 3 in a concentric relation to rotation axis B with a predetermined width. Contact region D is separated into upper region D1 and lower region D2 by theoretical contact portion E explained later, in the direction of rotation axis B. The depth of the recesses is gradually increased from theoretical contact portion E toward at least one end of contact region D which are opposed to each other in the direction of rotation axis B, namely, along the swing direction of power roller 3. In this embodiment, the depth of the recesses is gradually increased from theoretical contact portion E toward both the ends of contact region D within upper and lower regions D1 and D2.

Figure 2:
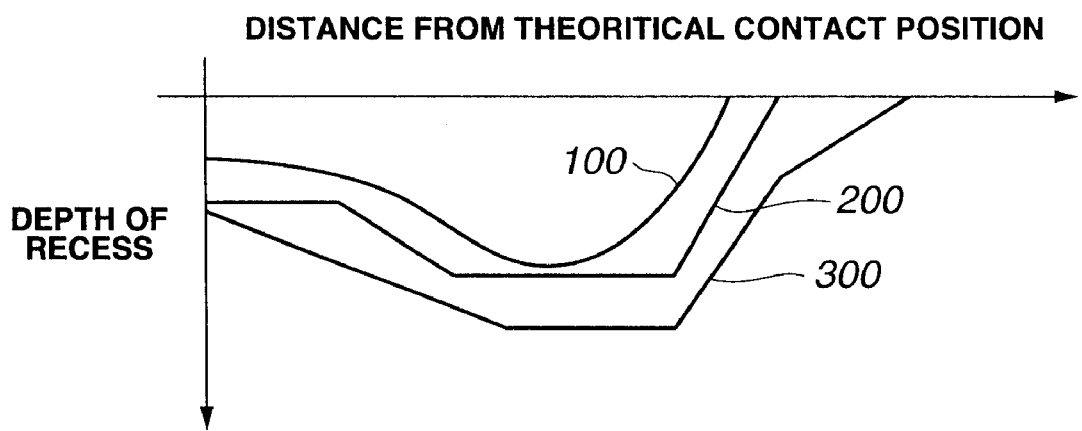
FIG. 2 is a graph showing a relationship between a distance from a theoretical contact portion and a depth of recesses of a microstructure formed on a traction surface of the power roller.

FIG. 2 illustrates three examples 100, 200 and 300 showing a relationship between a distance from theoretical contact portion E and a depth of the recess within upper region D1 of contact region D. As illustrated in FIG. 2, as the distance from theoretical contact portion E becomes larger, the depth of the recess is gradually increased. The depth of the recess is decreased again near the upper end of upper region D1 which is remotest from theoretical contact portion E. This is because the recess is to be disappeared toward outside of upper region D1.

Figure 3:
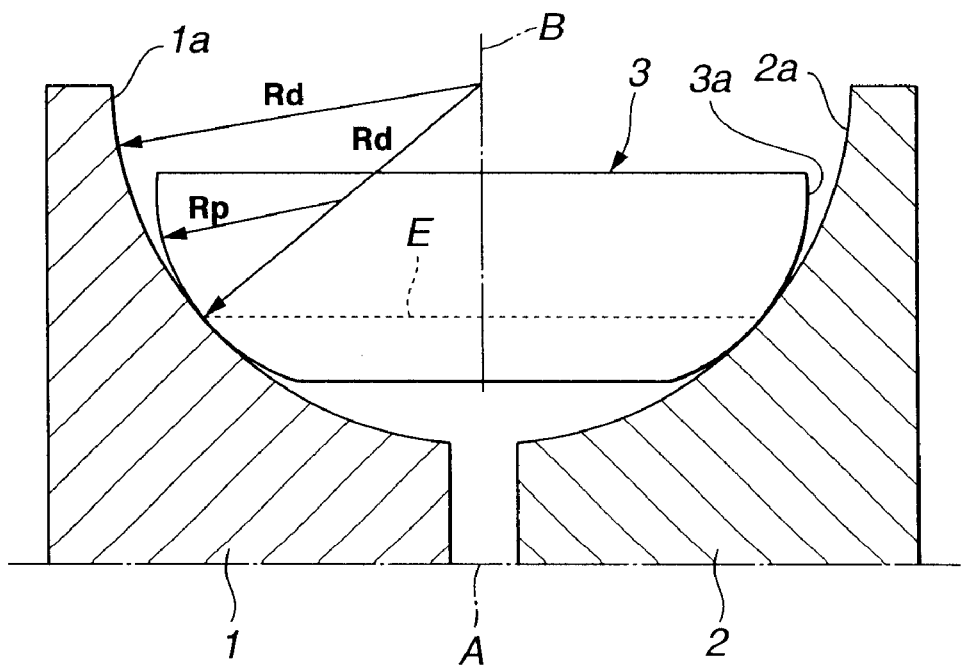
FIG. 3 is an explanatory diagram for the theoretical contact portion of the power roller.

Referring now to FIG. 3, theoretical contact portion E between power roller 3 and input and output disks 1 and 2 is explained. Traction surface 3a of power roller 3 is a convexly curved surface of a torus formed by rotating a circular arc having radius Rp of curvature about rotation axis B. That is, traction surface 3a of power roller 3 is determined by a length of radius Rp of curvature and a distance between a center of the curvature and rotation axis B. Each of traction surfaces 1a and 2a of input and output disks 1 and 2 is a concavely curved surface of a torus formed by rotating a circular arc having radius Rd of curvature about rotation axis A. Theoretical contact portion E is a position in which traction surface 3a of power roller 3 is inscribed in a sphere whose radius is equivalent to radius Rd of curvature of traction surfaces 1a and 2a of disks 1 and 2.

In other words, theoretical contact portion E is a position in which a substantial center of a contact ellipse between traction surface 3a of power roller 3 and traction surfaces 1a and 2a of disks 1 and 2 is located. The contact ellipse is an elliptical contact area where traction surface 3a of power roller 3 is in contact with traction surfaces 1a and 2a of disks 1 and 2. Contact region D is determined by the contact ellipses continuously connected in a circumferential direction of power roller 3. Theoretical contact portion E, therefore, is located in a substantial center of contact region D. The ratio of the width of contact region D along rotation axis B to the width of traction surface 3a along rotation axis B is in the range of approximately 1/10 to 1/3 relative.

Thus-constructed toroidal CVT is operative to transmit the rotation of input disk 1 to output disk 2 via power rollers 3. During the transmission, power rollers 3 are swung and inclined relative to disks 1 and 2 so that the contact between power rollers 3 and disks 1 and 2 shifts. This changes the ratio of the torque radius of input disk 1 to that of output disk 2 to thereby continuously change the gear ratio.

In the toroidal CVT of the present invention, the recesses of the microstructure are formed in contact region D of traction surface 3a of power roller 3 as explained above. With the arrangement, the thickness of the traction oil film formed between traction surface 3a of power roller 3 and traction surfaces 1a and 2a of input and output disks 1 and 2 can be prevented from being excessively thickened within all speed ranges even under the operating condition of high-speed rolling. The thickness of the traction oil film can be kept suitable for maintaining high traction coefficient.

Further, on traction surface 3a of power roller 3, the depth of the recesses formed in contact region D is reduced at the central portion of the contact ellipse which corresponds to theoretical contact portion E. The depth of the recesses is gradually increased toward the opposite ends of the contact ellipse which are opposed in the swing direction of power roller 3, namely, in the direction of rotation axis B, within upper and lower regions D1 and D2 of contact region D. Specifically, since the contact surface pressure on the central portion of the contact ellipse is high, the thickness of the traction oil film disposed at the central portion of the contact ellipse is prevented from excessively increasing in spite of the reduced depth of the recesses formed thereat. Therefore, peelings can be suppressed at the central portion of the contact ellipse. On the other hand, since the depth of the recesses is gradually increased toward the opposite ends of the contact ellipse, the traction oil can be facilitated to flow out of the central portion of the contact ellipse so that a proper traction oil film is formed thereat. Further, the increase in depth of the recesses toward the opposite ends of the contact ellipse results in sufficient duration of power roller 3 because of less amount of wear that otherwise tends to be caused at the opposite ends of the contact ellipse by spin. In addition, since the contact surface pressure on the opposite end portions of the contact ellipse is low, power roller 3 can be prevented from being deteriorated in durability even if the depth of the recesses formed at the opposite end portions of the contact ellipse is increased. The toroidal CVT of the present invention can maintain high traction coefficient and suppress the peelings at the central portion of the contact ellipse and the wear at the opposite ends thereof to thereby assure sufficient durability.

Furthermore, the recesses are formed only within contact region D of traction surface 3a of power roller 3, as a minimal area for the contact with traction surfaces 1a and 2a of disks 1 and 2. This can serve for saving the production time and cost. Further, the occurrence of cracks at large-diameter and small-diameter end portions of power roller 3 can be effectively restricted.

The variation of the surface roughness of traction surface 3a of power roller 3 is not limited to the variation of the depth of the recesses of the microstructure in the direction of rotation axis B of power roller 3 as explained in the first embodiment. The density of the recesses of the microstructure of traction surface 3a of power roller 3, or both of the depth and the density thereof may be varied in the direction of rotation axis B.

Figure 10A:
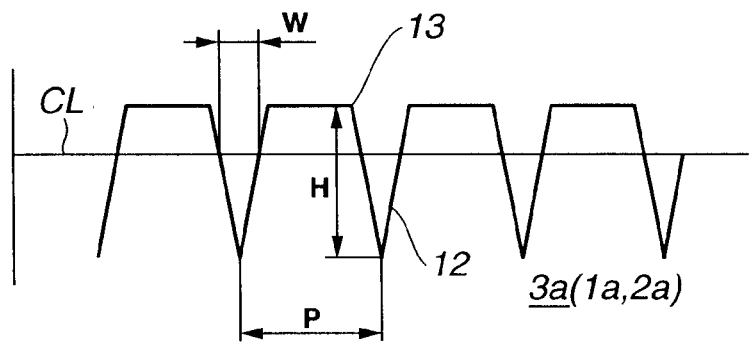
FIGS. 10A–10C are explanatory diagrams showing different shapes of a profile of the traction surface of each of the disks and power roller of the toroidal CVT of the present invention.
Figure 10B:
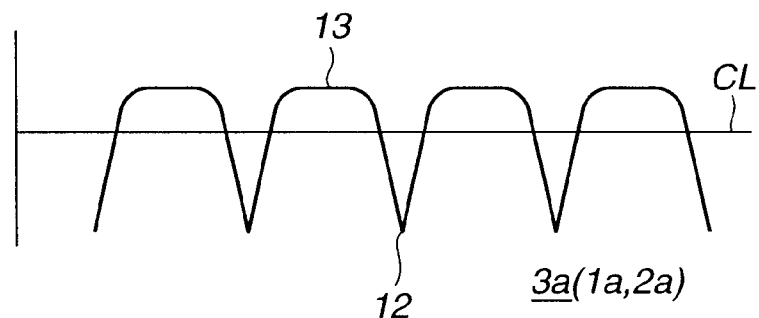
Figure 10C:
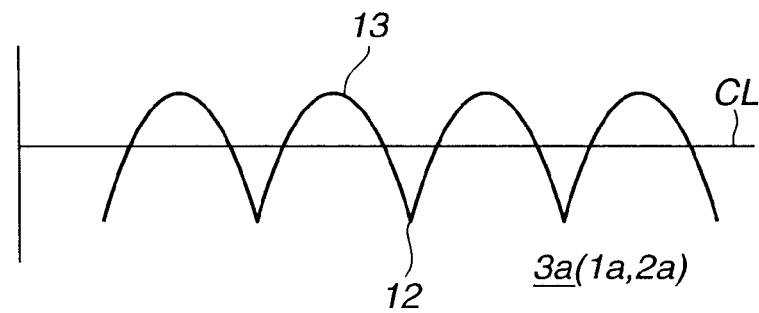
Figure 11A:
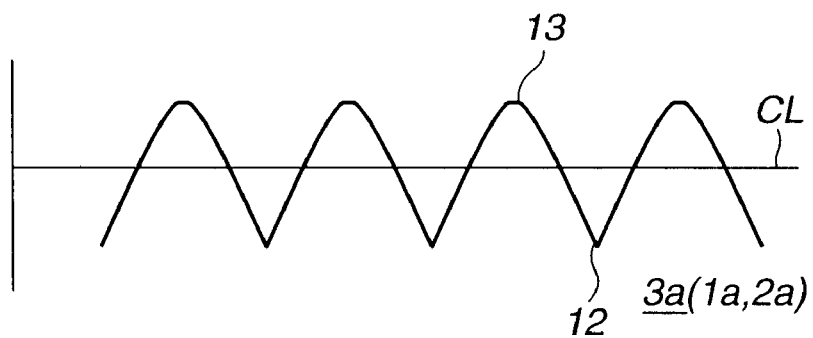
FIGS. 11A–11B are explanatory diagrams similar to those of FIGS. 10A–10C, but showing further different shapes of the profile of the traction surface.
Figure 11B:
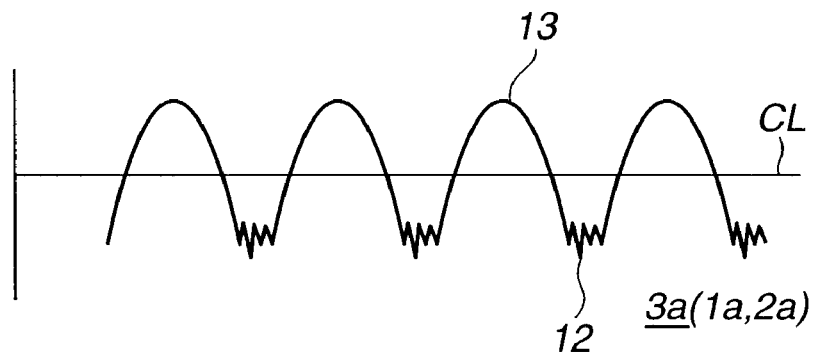
Figure 12A:
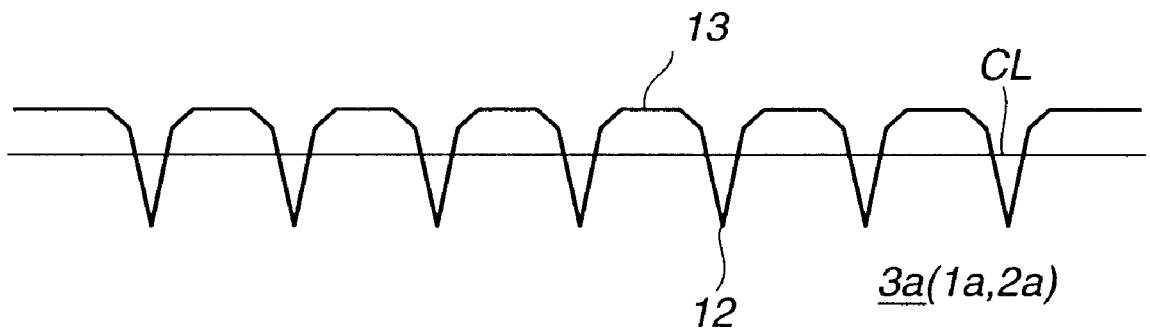
FIGS. 12A–12C are explanatory diagrams similar to those of FIGS. 10A–10C and 11A–11B, but showing still further different shapes of the profile of the traction surface.
Figure 12B:
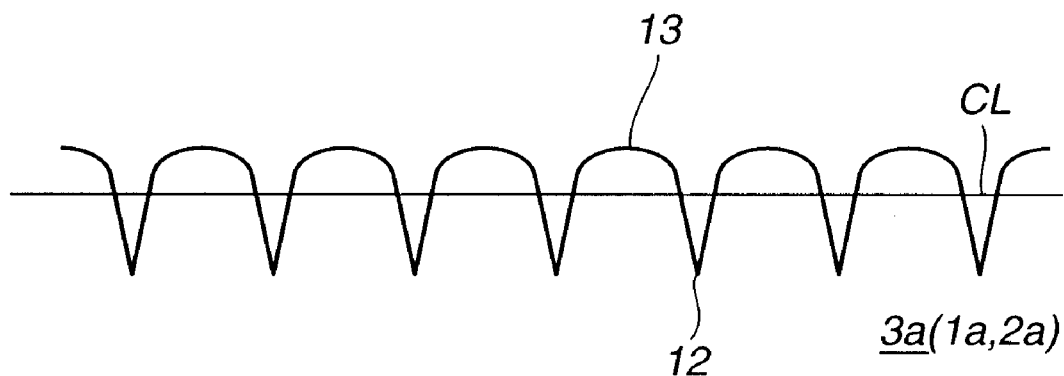
Figure 12C:
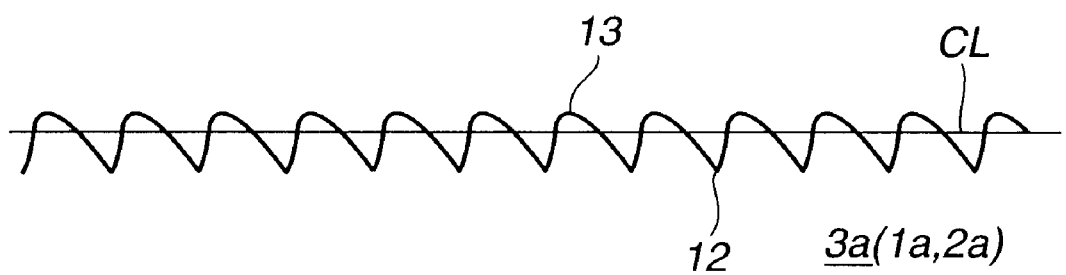
Figure 19:
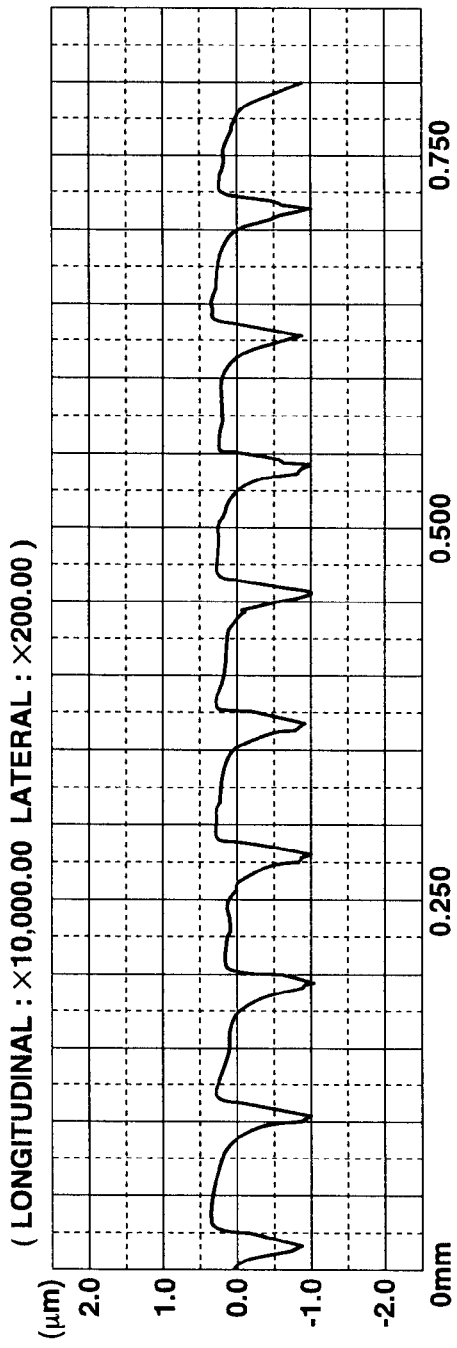
Figure 20:
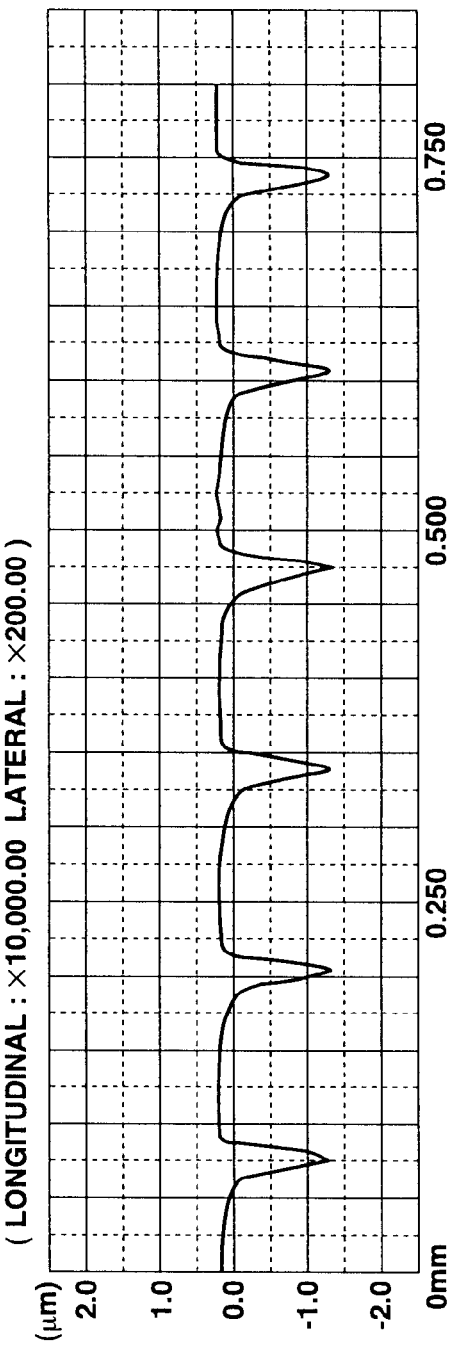
Figure 21:
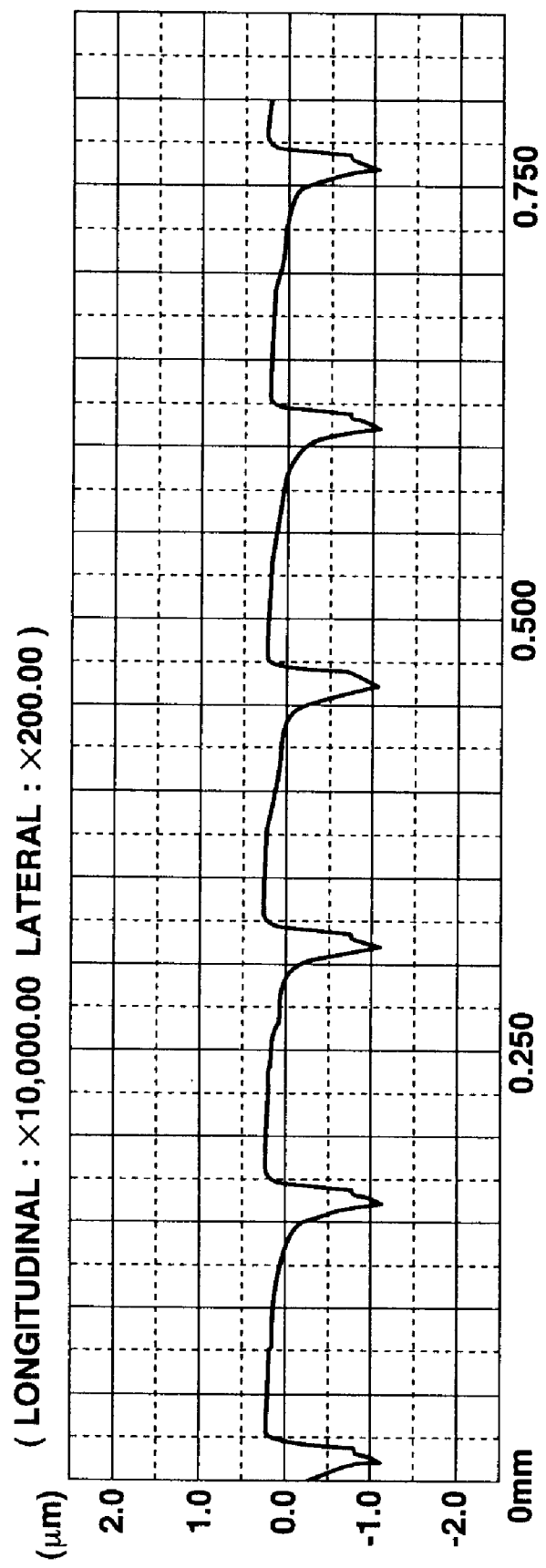

Referring now to FIGS. 10A–12C, there are shown examples of shapes of valleys 12 and ridges 13 appearing on an unfiltered primary profile curve of traction surface 3a of power roller 3 of the toroidal CVT of the present invention. The unfiltered primary profile curve is measured using a surface roughness tester. Valleys 12 and ridges 13 are alternately arranged and correspond to the recesses and the projections of the microstructure of traction surface 3a. The examples of shapes of ridges 13 located at a portion higher than center line CL of the profile curves include a generally trapezoidal shape shown in FIG. 10A, a generally trapezoidal shape with rounded corners shown in FIG. 10B, a generally elliptic arc or sinusoidal shape shown in FIG. 10C, and a generally triangular shape with a rounded apex shown in FIG. 11A. The examples of shapes of ridges 13 also include a generally trapezoidal shape with chamfered corners shown in FIG. 12A, a generally crowning shape shown in FIG. 12B, and the one-sided crowning shape formed by lapping shown in FIG. 12C. There are no limitations to a shape of bottoms of valleys 12, and the shape of bottoms thereof may have fine irregularities shown in FIG. 11B. These shapes serve for suppressing metal-to-metal contact caused at the mutual contact portion between traction surfaces 1a and 2a of disks 1 and 2 and traction surface 3a of power roller 3 and at the same time, for providing high traction coefficient. FIG. 10A typically shows height difference H between the top of ridge 13 and the bottom of valley 12, pitch P of valleys 12, and width W of valley 12. Width W is a length of the segment of center line CL which corresponds to valley 12. The segment is given by crossing center line CL with the unfiltered primary profile curve.

Examples as conducted in line with the concept of the present invention are explained below.

Each of input and output disks 1 and 2 was formed from a workpiece made of JIS SCM435H steel. The workpiece was subjected to carbonitriding-quenching-tempering to have a Vickers hardness of Hv750, and then subjected to superfinishing to form traction surface 1a and 2a. Each disk 1 and 2 having traction surface 1a and 2a was thus formed. The unfiltered primary profile curve of traction surface 1a and 2a of disk 1 and 2 is shown in FIG. 13.

Power roller 3 was formed from a workpiece made of JIS SCM435H steel. The workpiece was subjected to carbonitriding-quenching to have a Vickers hardness of Hv750. The workpiece was then subjected to ultra-precision cutting using a polycrystalline cubic boron nitride (c-BN) tool having a round end having an R 50 $\mu$m, to form circumferential grooves at equal intervals and projections between the grooves. The circumferential grooves were in the form of a spiral groove extending along the rotating direction of power roller 3. Subsequently, the projections were machined by tape lapping to form flat lands on the tops of the projections. Traction surface 3a was thus obtained.

The unfiltered primary profile curve of traction surface 3a of power roller 3 is shown in FIG. 14. The shape of ridges located higher than center line CL of the unfiltered primary profile curve as explained in FIGS. 10A–12C, is a generally trapezoidal shape with rounded corners. At a maximum recess-depth portion in which the depth of the recesses becomes maximum, height difference H between the top of the ridge and the bottom of the valley is 2.4 $\mu$m. Pitch P of the valleys is 120 $\mu$m. Pitch P is used as a factor representing the density of the recesses. Width W of the valley, namely, a length of the segment of center line CL which corresponds to the valley, is approximately 30–35 $\mu$m. The ratio of a sum of width W of the valleys to a reference length of center line CL is within a range of 25–29%. A radius of curvature of a top portion of the ridge of the unfiltered primary profile curve measured using the surface roughness tester which is set at equal longitudinal and lateral magnifications, is 10 mm. Arithmetical mean roughness Ra of the top portion of the ridge is approximately 0.005 $\mu$m.

A performance test of the toroidal CVT using thus-produced disks 1 and 2 and power roller 3 was conducted. In the test, the maximum torque that can be transmitted without occurrence of gross slip between traction surfaces 1a, 2a and 3a during the operation, was measured under the following condition. Oil temperature was 110° C., and input rotation number was 4000 rpm. Gear ratio was 1:1 at which the circumferential speed was 20 m/s. The loading force applied to power roller 3 was set at a fixed value. The test was carried out several times in which the loading force was set at different values. The test results were compared with those of the conventional CVTs using the disks and the power roller each having smooth traction surfaces which were formed by superfinishing. The maximum torque measured was approximately 1.05–1.3 times that of the conventional CVTs. The maximum torque is effective in improving the traction coefficient.

Additional examples were conducted in the same manner as described above, except that traction surface 3a of power roller 3 had different depth and density of the recesses or the unfiltered primary profile curve thereof had different characteristics. FIGS. 15–21 show the unfiltered primary profile curves of traction surfaces 3a of these examples, respectively. Each unfiltered primary profile curve includes alternately arranged valleys and ridges corresponding to the recesses and the projections of traction surface 3a. The ridges of the unfiltered primary profile curve have portions that are located higher than center line CL and have either one of the generally trapezoidal shape with rounded corners shown in FIG. 10B, the generally elliptic arc or sinusoidal shape shown in FIG. 10C, the generally triangular shape with a rounded apex shown in FIG. 11A, the generally trapezoidal shape with chamfered corners shown in FIG. 12A, and a generally crowning shape shown in FIG. 12B. Height difference H between the top of the ridge and the bottom of the valley at the maximum recess-depth portion is within a range of 0.8–2.4 $\mu$m. Pitch P of the valleys is within a range of 40–150 $\mu$m. Width W of the valley is approximately 13–35 $\mu$m. The ratio of a sum of width W of the valleys to a reference length of center line CL is within a range of 15–40%. A radius of curvature of a top portion of the ridge of the unfiltered primary profile curve measured using the surface roughness tester which is set at equal longitudinal and lateral magnifications, is within a range of 0.8–170 mm. Arithmetical mean roughness Ra of the top portion of the ridge is approximately 0.005–0.02 $\mu$m. In these additional examples, the same performance test as explained above was carried out to measure the maximum torque. The maximum torque measured was approximately 1.05–1.3 times that of the conventional CVTs.

It was found from the test results that high traction coefficient was obtained and at the same time, metal-to-metal contact on the mutual contact portions between traction surfaces 1a and 2a of disks 1 and 2 and traction surface 3a of power roller 3 was effectively suppressed. It was recognized that the torque transmission was improved. Meanwhile, it was noted that the formation of the spiral groove was effective in saving the production time and improving the working efficiency.

Further, it was found that substantially the same effects as described above were exhibited in a case where traction surface 3a of power roller 3 was produced by forming dimples having a diameter of approximately 2 $\mu$m by shot-peening and then flattening outer-most portions of the projections disposed between the dimples by lapping.

Referring to FIGS. 4A–4D, a second embodiment of the toroidal CVT of the invention will be explained. This embodiment differs from the first embodiment in that the surface roughness of traction surface 1a and 2a of each of input and output disks 1 and 2 varies in the direction of rotation axis A. In this embodiment, traction surface 1a and 2a of each disk 1 and 2 has the microstructure with irregularities formed by recesses and projections. The recesses are in the form of dimples or a continuously extending circumferential groove.

Specifically, the recesses formed on traction surface 1a of input disk 1 have the depth gradually increased from the reduced-diameter side of input disk 1 toward the increased-diameter side thereof as indicated by arrow F in FIG. 4B, namely, in the direction of rotation axis A. On the other hand, the recesses formed on traction surface 2a of output disk 2 have the depth gradually increased from the increased-diameter side of output disk 2 toward the reduced-diameter side thereof as indicated by arrow G in FIG. 4B, namely, in the direction of rotation axis A. Valleys and ridges of the unfiltered primary profile curve of traction surface 1a and 2a are the same in shape as either one of FIGS. 10A–12C.

A relationship between a circumferential speed of input disk 1 at the contact portion relative to power roller 3, and a circumferential speed of output disk 2 at the contact portion relative to power roller 3, is now explained.

When the operation is shifted from LOW speed range shown in FIG. 4B to HIGH speed range shown in FIG. 4D, the mutual contact portion between input disk 1 and power roller 3 is moved from the reduced-diameter side of input disk 1 to the increased-diameter side thereof. As the mutual contact portion is moved toward the increased-diameter side of input disk 1, the circumferential speed of input disk 1 at the mutual contact portion becomes higher. Here, in the conventional toroidal CVTs, in HIGH speed range, the thickness of the traction oil film disposed at the mutual contact portion between the increased-diameter side of the input disk and the power roller will be increased due to the high circumferential speed on the increased-diameter side of the input disk. In this embodiment, traction surface 1a of input disk 1 has the recesses whose depth is gradually increased toward the increased-diameter side of input disk 1 as described above. With the arrangement of the recesses, the traction oil film disposed at the mutual contact portion between power roller 3 and the increased-diameter side of input disk 1 can be prevented from being increased in thickness.

Upon the same shifting operation from LOW speed range to HIGH speed range, the mutual contact portion between output disk 2 and power roller 3 is moved from the increased-diameter side of output disk 2 to the reduced-diameter side thereof. In both LOW and HIGH speed ranges shown in FIGS. 4B and 4D, the circumferential speed of output disk 2 at the mutual contact portion is substantially equivalent to the circumferential speed of input disk 1 at the mutual contact portion as indicated by arrows in FIGS. 4A and 4C. Therefore, as the mutual contact portion between output disk 2 and power roller 3 is moved toward the reduced-diameter side of output disk 2, the circumferential speed of output disk 2 at the mutual contact portion becomes higher. In this embodiment, the recesses of traction surface 2a of output disk 2 have the depth gradually increased toward the reduced-diameter side. With the arrangement of the recesses, the traction oil film disposed at the mutual contact portion between power roller 3 and the reduced-diameter side of output disk 2 can be prevented from being thickened.

As described above, in this embodiment, the traction oil film formed between input and output disks 1 and 2 and power roller 3, i.e., at the mutual contact portion between disks 1 and 2 and power roller 3, can be restrained from being increased in thickness when the circumferential speed of the mutual contact portion becomes higher in HIGH speed range. The traction oil film, therefore, can have a suitable thickness for effectively performing the torque transmission between input and output disks 1 and 2 and power roller 3. This serves for assuring high traction coefficient of input and output disks 1 and 2.

Figure 5:
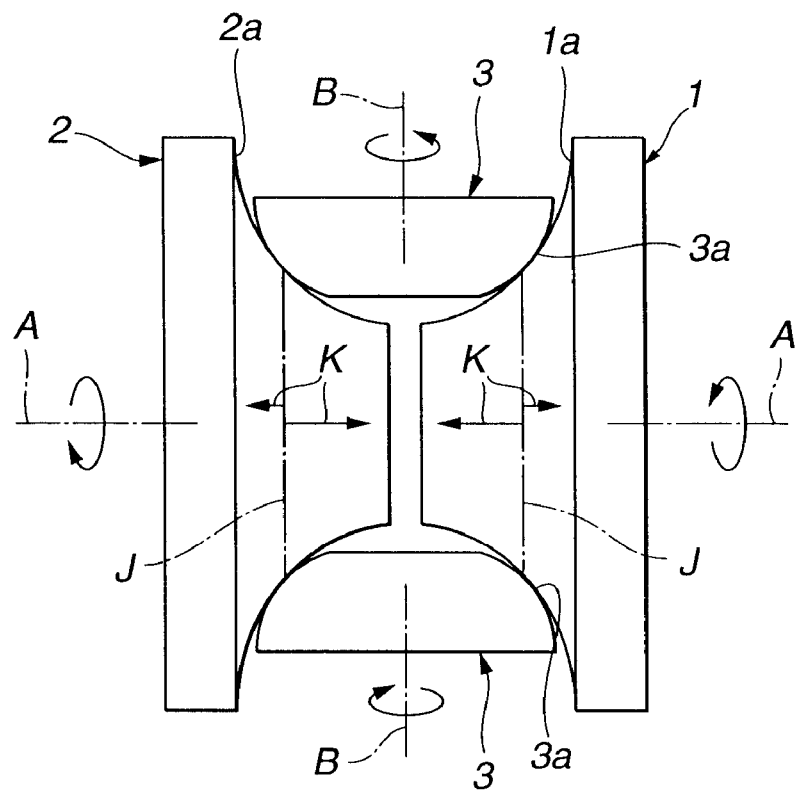
FIG. 5 is a diagram showing the toroidal CVT of a third embodiment according to the present invention.
Figure 6:
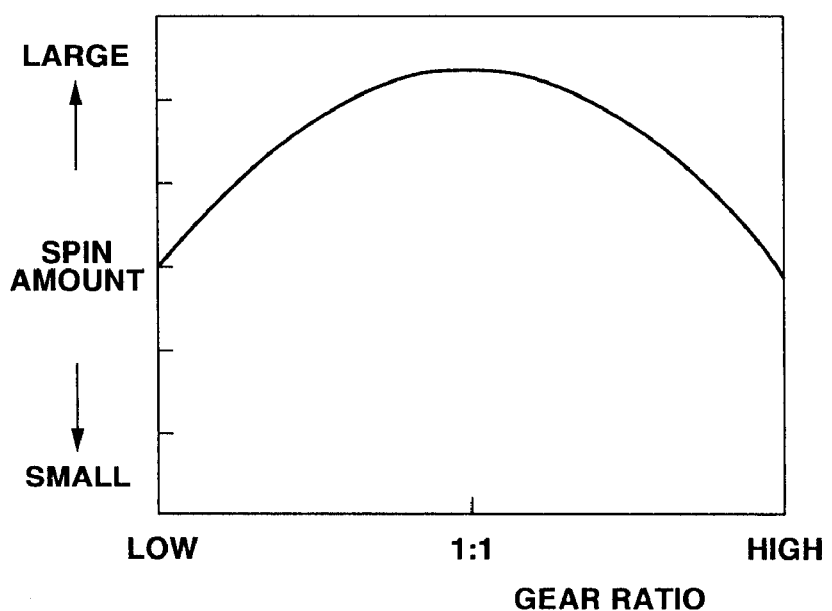
FIG. 6 is a graph showing a relationship between gear ratio between input and output disks and spin amount occurring between the disks and the power roller in the toroidal CVT.
Figure 9:
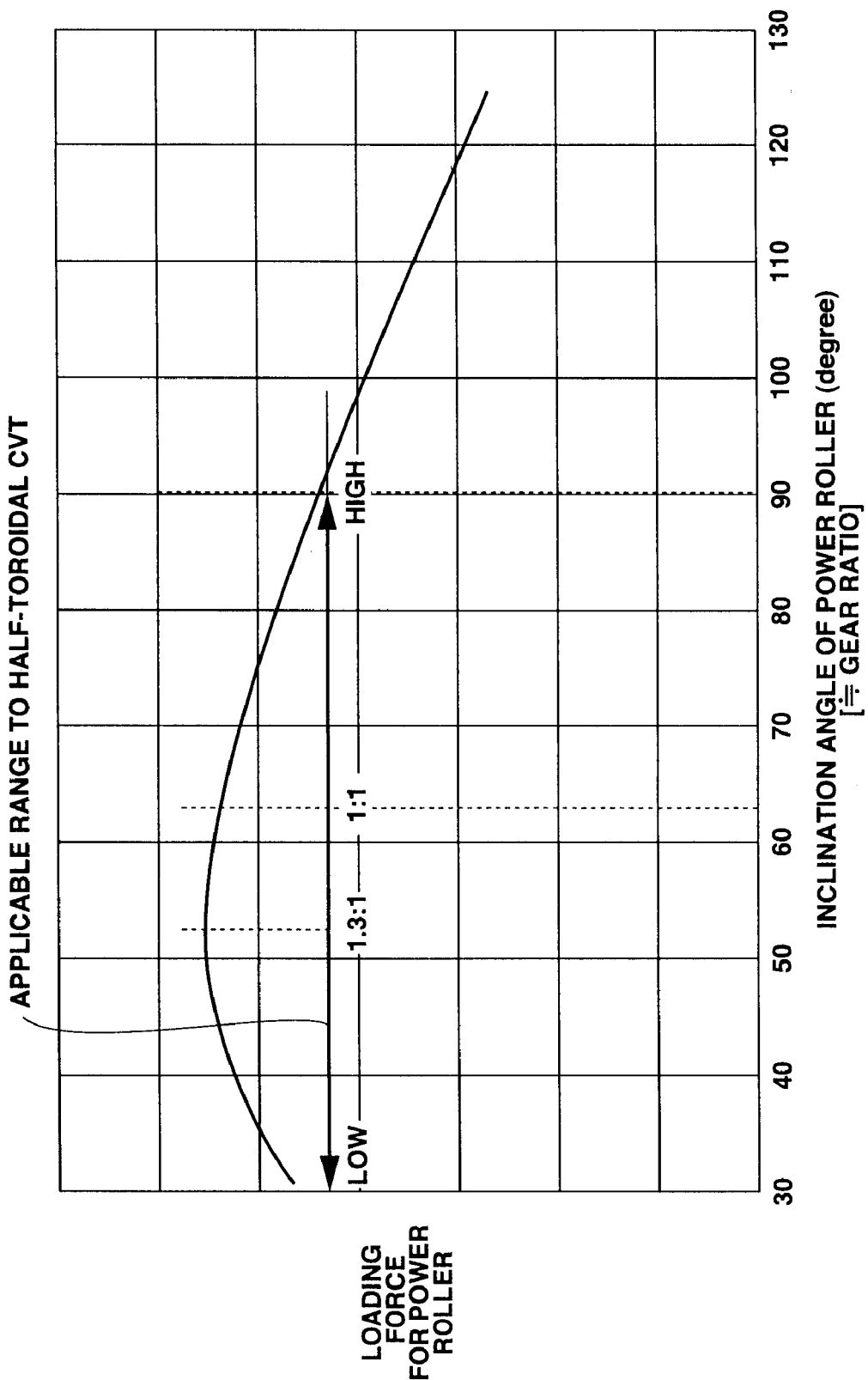
FIG. 9 is a graph showing a relationship between gear ratio between the disks and loading force required for the power roller in the toroidal CVT.

Referring to FIGS. 5, 6 and 9, a third embodiment of the toroidal CVT of the invention will be explained hereinafter.

As illustrated in FIG. 5, traction surface 1a and 2a of each of input and output disks 1 and 2 includes a central contact region as simply indicated by broken line J, with respect to traction surface 3a of power roller 3. When the toroidal CVT is operated such that input and output disks 1 and 2 are in contact with power roller 3 at central contact region J, a gear ratio between input and output disks 1 and 2 is within a range of 1:1 to 1.3:1. A reduced-diameter side contact portion and an increased-side contact portion are disposed adjacent to central contact region J and extend in opposite directions as indicated by arrows K in FIG. 5. Central contact region J, the reduced-diameter side contact portion and the increased-side contact portion have a microstructure with irregularities formed by recesses and projections. The recesses have the depth that is gradually reduced from central contact region J into both the reduced-diameter side contact portion and the increased-diameter side contact portion in the opposite directions K in FIG. 5 along rotation axis A.

FIG. 6 shows a relationship between a gear ratio between input and output disks 1 and 2 and an amount of spin occurring between traction contact portions of disks 1 and 2 and power roller 3. As seen from FIG. 6, when the gear ratio is approximately 1:1, the spin amount becomes maximum. The maximum spin amount causes heat at the traction contact portions of disks 1 and 2 and power roller 3, whereby the temperature of the traction oil disposed at the traction contact portions rises to decrease the viscosity of the traction oil. In the conventional toroidal CVTs, there is a tendency to deteriorate the traction coefficient due to the decrease of the traction oil viscosity.

FIG. 9 shows a characteristic curve of a loading force for power rollers which is required for transmitting torque without loss, relative to a gear ratio between input and output disks of the toroidal CVTs. In FIG. 9, the gear ratio is represented by an inclination or swing angle of the power roller. When the gear ratio is approximately 1.3:1, the required loading force becomes maximum. The relationship between the loading force and the gear ratio is described in "Toroidal CVT", p. 29–30, authored by Hirohisa Tanaka and published from CORONA PUBLISHING CO., LTD. However, since a loading cam creates the loading force in proportion to the torque, the torque transmission performance substantially decreases at the gear ratio of approximately 1.3:1. Therefore, higher traction coefficient is required at the gear ratio of approximately 1.3:1 for less deterioration of the torque transmission performance.

In the third embodiment described above, traction surface 1a and 2a of each of input and output disks 1 and 2 includes the recesses that are the maximum in depth in central contact region J relative to power roller 3 where the gear ratio between input and output disks 1 and 2 is within the range of 1:1 to 1.3:1. The depth of the recesses is reduced in the reduced-diameter side contact portion and increased-diameter side contact portion of traction surface 1a and 2a. Thus, the depth of the recesses is the maximum in central contact region J where the traction oil viscosity is decreased due to the heat generation caused by the large amount of spin and where the torque transmission performance is lowered due to the insufficient loading force created by the loading cam. With the arrangement of the recesses, the traction oil film disposed on central contact region J can have a proper thickness to increase a shear rate, whereby the traction coefficient can be prevented from being lowered due to the decrease of the traction oil viscosity. As a result, high traction coefficient of input and output disks 1 and 2 can be assured, resulting in less deterioration of the torque transmission performance. Meanwhile, in this embodiment, a half-toroidal CVT in which the power roller has a half-vertical angle of 60 degrees is used. If the half-vertical angle is varied, the contact region of the traction surface of each disk relative to the traction surface of the power roller will be displaced and therefore the depth of the recesses must be adjusted.

Figure 7A:
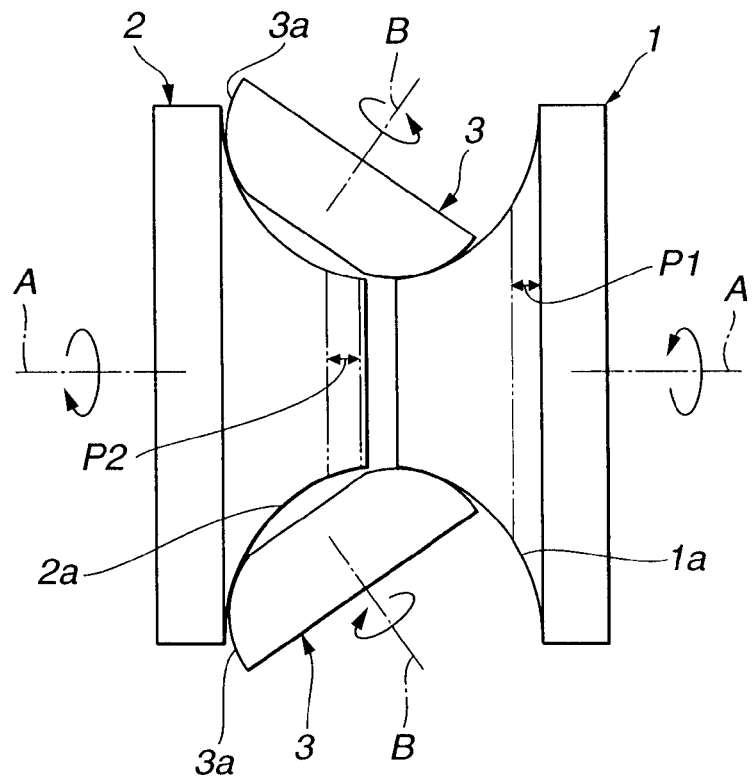
FIG. 7A is a diagram showing the toroidal CVT of a fourth embodiment according to the present invention, showing the toroidal CVT in LOW speed range.
Figure 7B:
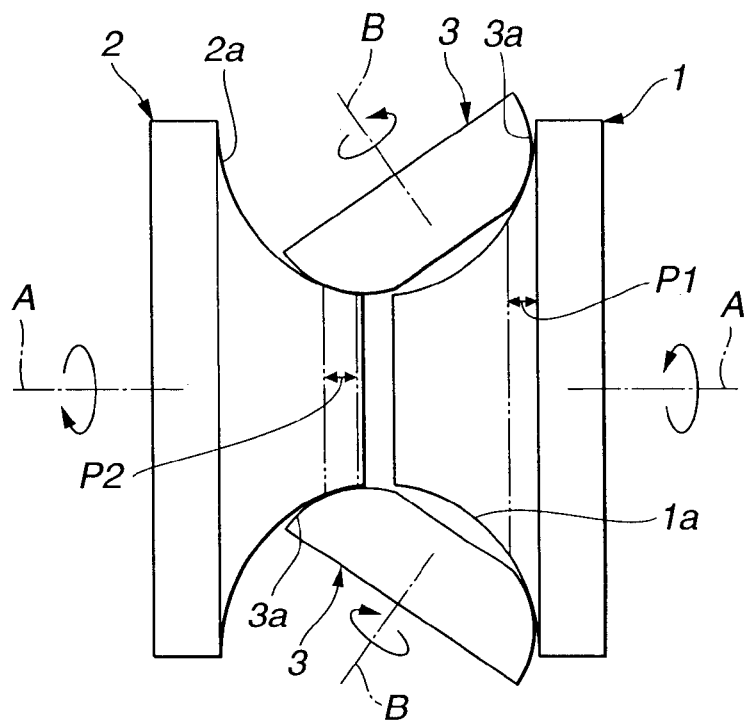
FIG. 7B is a diagram similar to FIG. 7A, but showing the toroidal CVT in HIGH speed range.

Referring now to FIGS. 7A and 7B, a fourth embodiment of the toroidal CVT of the invention is explained.

As illustrated in FIGS. 7A and 7B, traction surfaces 1a and 2a of input and output disks 1 and 2 include increased-diameter side contact portion P1 and reduced-diameter side contact portion P2, respectively. Increased-diameter side contact portion P1 is located on the increased-diameter side of input disk 1 and reduced-diameter side contact portion P2 is located on the reduced-diameter side of output disk 2. Increased-diameter side contact portion P1 and reduced-diameter side contact portion P2 are disposed within contact regions of traction surfaces 1a and 2a, respectively, which are brought into contact with traction surface 3a of power roller 3. Increased-diameter side contact portion P1 and reduced-diameter side contact portion P2 have a microstructure with irregularities formed by recesses and projections.

As explained in the second embodiment shown in FIGS. 4A–4D, upon the shifting operation from LOW speed range to HIGH speed range, the circumferential speed of input disk 1 becomes higher on the increased-diameter side and the circumferential speed of output disk 2 becomes higher on the reduced-diameter side. In the conventional toroidal CVTs, the higher circumferential speed tends to cause the thickness of the traction oil film to be increased. In the fourth embodiment, the microstructure with irregularities is arranged within increased-diameter side contact portion P1 and reduced-diameter side contact portion P2 of traction surfaces 1a and 2a of input and output disks 1 and 2, on which the circumferential speed becomes higher. With this arrangement, the traction oil film disposed between the increased-diameter side of input disk 1 and power roller 3 and between the reduced-diameter side of output disk 2 and power roller 3 can be restrained from being thickened due to the higher circumferential speed on the respective increased-diameter side of input disk 1 and reduced-diameter side of output disk 2.

Further, in this embodiment, with the arrangement of the microstructure only in increased-diameter side contact portion P1 and reduced-diameter side contact portion P2 of traction surfaces 1a and 2a of input and output disks 1 and 2, a region required to be formed with the recesses of the microstructure can be limited to thereby save the production time, work and cost. The occurrence of cracks due to formation of the recesses can be suppressed in portions outside of increased-diameter side contact portion P1 and reduced-diameter side contact portion P2, specially, in the opposite end portions on the increased-diameter and reduced-diameter sides of disk 1 and 2. As a result, the durability of disks 1 and 2 can be improved.

Figure 8:
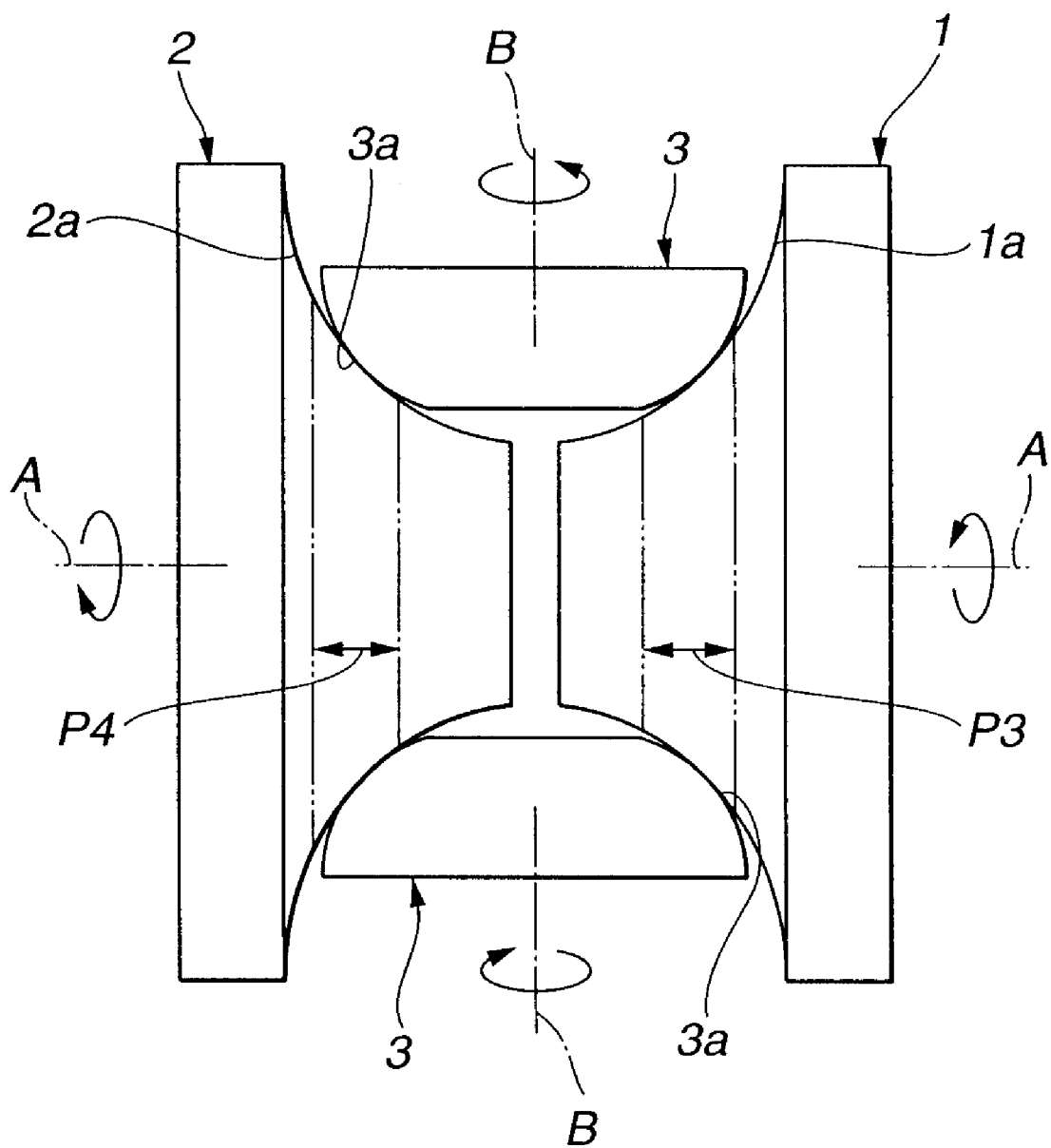
FIG. 8 is a diagram showing the toroidal CVT of a fifth embodiment according to the present invention.

Referring to FIG. 8, a fifth embodiment of the toroidal CVT of the invention will be explained hereinafter.

As illustrated in FIG. 8, traction surfaces 1a and 2a of input and output disks 1 and 2 include contact regions P3 and P4 relative to traction surface 3a of power roller 3, respectively. Contact regions P3 and P4 are brought into contact with traction surface 3a during the swing operation of power roller 3. When the toroidal CVT is operated such that input and output disks 1 and 2 are in contact with power roller 3 in respective contact regions P3 and P4, a gear ratio between input and output disks 1 and 2 is within a range of 1:1 to 1.3:1. Each of contact regions P3 and P4 has a microstructure with irregularities formed by recesses and projections. Specifically, since the recesses of the microstructure are formed within contact regions P3 and P4 where the gear ratio between disks 1 and 2 is within the range of 1:1 to 1.3:1, the thickness of the traction oil film disposed at contact regions P3 and P4 can be adequately adjusted in spite of the maximum spin amount occurring therein as discussed above using FIG. 6. As a result, the traction coefficient of each of input and output disks 1 and 2 can be prevented from being deteriorated. In addition, with the arrangement of the recesses of the microstructure within contact regions P3 and P4 where the gear ratio between disks 1 and 2 is within the range of 1:1 to 1.3:1, the torque transmission performance can be restrained from being deteriorated due to the decrease of the loading force which is caused at the gear ratio of approximately 1.3:1 as explained above using FIG. 9. The recesses of the microstructure may be formed in only a portion of contact regions P3 and P4 which will most adversely affect the traction coefficient and the torque transmission performance. Further, similar to the above fourth embodiment, the production time, work and cost can be saved. The occurrence of cracks due to formation of the recesses can be suppressed in portions outside of contact regions P3 and P4, whereby the durability of disks 1 and 2 can be improved.

The recesses of the microstructure are not limited to those as described in the embodiments, and may be varied in depth, density or both of depth and density. Even in such the case, the same effects as those of the embodiments can be obtained. Further, the recesses can be formed on traction surface 1a and 2a of either one of input and output disks 1 and 2, or any combination of the recesses of the above-described embodiments may be formed on traction surfaces 1a and 2a of disks 1 and 2. Furthermore, the recesses may be varied in shape, depth or density so as to avoid the deterioration of durability of input and output disks and power rollers which is caused by metal-to-metal contact, on the basis of operating conditions of the toroidal CVT. The recesses also may be varied so as to stably maintain so-called oil film thickness ratio in relation to surface roughness, depending on the temperature condition and gear ratio that influence the traction coefficient. The surface roughness may be set so as to assure the high traction coefficient as explained in the above-described embodiments, over under high temperature condition which causes large deterioration of the traction coefficient.

Further, the microstructure with irregularities can be formed on both of traction surfaces 1a and 2a of input and output disks 1 and 2 and traction surface 3a of power roller 3 in the following manner.

In a case where the microstructure with irregularities is formed on respective traction surfaces 1a, 2a and 3a of input and output disks 1 and 2 and power roller 3 in combination of the first and second embodiments, the thickness of the traction oil film between input and output disks 1 and 2 and power roller 3 can be optimally adjusted on the basis of both of the contact surface pressure at the contact ellipse of power roller 3 relative to disks 1 and 2 and the circumferential speed of disks 1 and 2. Owing to the proper adjustment of the thickness of the traction oil film, the durability can be assured and the high traction coefficient can be maintained.

Furthermore, the microstructure with irregularities can be formed on traction surfaces 1a and 2a of input and output disks 1 and 2 as described in the third embodiment, and on traction surface 3a of power roller 3 as described in the second embodiment. In this case, the thickness of the traction oil film can be optimally adjusted according to the contact surface pressure at the contact ellipse of power roller 3 relative to disks 1 and 2, as well as the spin amount at the mutual contact portion between disks 1 and 2 and power roller 3 and the loading force for power roller 3, the latter two of which are concerned with the gear ratio between disks 1 and 2.

In addition, recesses can be formed on a part of traction surface 3a of power roller 3 which is always in contact with disks 1 and 2, for adjustment of the thickness of the traction oil film on the basis of the general operating condition, and at the same time, be formed on traction surfaces 1a and 2a of disks 1 and 2 for fine adjustment of the thickness of the traction oil film. In this case, since the recesses are formed on both sides of the mutual contact portion between power roller 3 and disks 1 and 2, the recesses may be reduced in depth. Therefore, the occurrence of cracks due to formation of the recesses can be effectively restricted.

This application is based on Japanese Patent Applications No. 2000-196684 filed on Jun. 29, 2000, No. 2000-210078 filed on Jul. 11, 2000, and No. 2001-062696 filed on Mar. 6, 2001, the entire contents of which, inclusive of the specification, claims and drawings, are hereby incorporated by reference herein.

Although the invention has been described above by reference to certain embodiments and examples of the invention, the invention is not limited to the embodiment and examples described above. Modifications and variations of the embodiments and examples described above will occur to those skilled in the art, in light of the above teachings. The scope of the invention is defined with reference to the following claims.

What is claimed is:

1. A toroidal continuously variable transmission, comprising:

an input disk;

an output disk, the input and output disks having a common first rotation axis about which the input and output disks are rotatable; and a power roller swingably interposed between the input and output disks and having a second rotation axis intersecting the first rotation axis, about which the power roller is rotatable, the input and output disks and the power roller having traction surfaces cooperating with each other to transmit rotation between the input and output disks and the power roller, at least one of the input and output disks and the power roller having a surface roughness on the traction surface thereof which varies in a direction of the rotation axis thereof.

2. The toroidal continuously variable transmission as claimed in claim 1, wherein the at least one of the traction surfaces comprises a microstructure with irregularities at only a contact region thereof.

3. The toroidal continuously variable transmission as claimed in claim 1, wherein the traction surface of the power roller comprises a microstructure with irregularities formed by recesses and projections at a region of the traction surface of the power roller which has opposite ends in the direction of the rotation axis, the recesses being varied such that at least one of a depth and a density thereof is increased from a theoretical contact portion between the power roller and the input and output disks toward at least one of the opposite ends of the region.

4. The toroidal continuously variable transmission as claimed in claim 1, wherein the traction surface of the input disk comprises a microstructure with irregularities formed by recesses and projections, the input disk comprising a reduced-diameter side and an increased-diameter side, the recesses being varied such that at least one of a depth and a density thereof is increased from the reduced-diameter side of the input disk toward the increased-diameter side of the input disk.

5. The toroidal continuously variable transmission as claimed in claim 1, wherein the traction surface of the output disk comprises a microstructure with irregularities formed by recesses and projections, the output disk comprising a reduced-diameter side and an increased-diameter side, the recesses being varied such that at least one of a depth and a density thereof is increased from the increased-diameter side of the output disk toward the reduced-diameter side of the output disk.

6. The toroidal continuously variable transmission as claimed in claim 1, wherein the traction surface of each of the input and output disks comprises a microstructure with irregularities formed by recesses and projections, a reduced-diameter side contact portion, an increased-diameter side contact portion and a contact region between the reduced-diameter side contact portion and the increased-diameter side contact portion in which a gear ratio between the input and output disks is within a range of 1:1 to 1.3:1, the recesses being varied such that at least one of a depth and a density is a maximum in the contact region and is reduced into the reduced-diameter side contact portion and the increased-diameter side contact portion.

7. The toroidal continuously variable transmission as claimed in claim 1, wherein the traction surface of the input disk comprises a contact region brought into contact with the traction surface of the power roller, the contact region comprising an increased-diameter side contact portion on which a microstructure with irregularities is disposed.

8. The toroidal continuously variable transmission as claimed in claim 1, wherein the traction surface of the output disk comprises a contact region brought into contact with the traction surface of the power roller, the contact region comprising a reduced-diameter side contact portion on which a microstructure with irregularities is disposed.

9. The toroidal continuously variable transmission as claimed in claim 1, wherein the traction surface of each of the input and output disks comprises a contact region relative to the traction surface of the power roller in which a gear ratio between the input and output disks is within a range of 1:1 to 1.3:1, and a microstructure with irregularities within the contact region.

10. The toroidal continuously variable transmission as claimed in claim 1, wherein the at least one of the traction surfaces comprises a microstructure with irregularities, the microstructure being represented by an unfiltered primary profile curve including alternately arranged valleys and ridges.

11. The toroidal continuously variable transmission as claimed in claim 10, wherein the unfiltered primary profile curve is measured using a surface roughness tester, each of the ridges of the unfiltered primary profile curve including an upper portion located higher than a center line with respect to the unfiltered primary profile curve, the upper portion having either one shape selected from a generally trapezoidal shape, a generally trapezoidal shape with rounded corners, a generally trapezoidal shape with chamfered corners, a generally crowning shape, a generally elliptic arc shape, a generally sinusoidal shape and a generally triangular shape with a rounded apex.

12. The toroidal continuously variable transmission as claimed in claim 10, wherein the microstructure comprises alternately arranged recesses and projections forming the irregularities, the microstructure comprising a maximum recess-depth portion where the recesses have a maximum depth, a height difference between a top of each ridge and a bottom of each valley in the maximum recess-depth portion being within a range of 0.7–2.5 µm.

13. The toroidal continuously variable transmission as claimed in claim 12, wherein the microstructure comprises a maximum recess-density portion where the recesses have a maximum density, in which a ratio of a total length of segments of the center line which correspond to the valleys of the unfiltered primary profile curve, to a reference length of the center line is within a range of 15–45%.

14. The toroidal continuously variable transmission as claimed in claim 12, wherein a pitch between the valleys adjacent to each other is within a range of 40–150 µm.

15. The toroidal continuously variable transmission as claimed in claim 12, wherein the unfiltered primary profile curve is measured by a surface roughness tester set at equal longitudinal and lateral magnifications, the ridges of the unfiltered primary profile curve comprising a top portion having a radius of curvature of 0.8–170 mm.

16. The toroidal continuously variable transmission as claimed in claim 12, wherein the ridge of the unfiltered primary profile curve comprises a top portion having an arithmetical mean roughness Ra of 0.02 µm or less.

17. The toroidal continuously variable transmission as claimed in claim 12, wherein the recesses are formed by a continuous groove spirally extending in substantially parallel to the rotating direction of the at least one of the input and output disks and the power roller.

18. The toroidal continuously variable transmission as claimed in claim 12, wherein the recesses are a plurality of dimples spaced from each other.

* * * * *